United States Patent [19]

Lee et al.

[11] 4,161,570

[45] Jul. 17, 1979

[54] PROCESS FOR THE PRODUCTION OF RADIATION CURABLE COATING COMPOSITIONS CONTAINING MICROCAPSULES

[75] Inventors: Yu-Sun Lee, Parma, Ohio; Dale R. Shackle, Scottsboro, Ala.

[73] Assignee: The Mead Corporation, Dayton, Ohio

[21] Appl. No.: 792,326

[22] Filed: Apr. 29, 1977

[51] Int. Cl.$^2$ ............................................... C08J 9/32
[52] U.S. Cl. ..................................... 521/53; 8/2.5 R; 8/7; 106/308 M; 427/44; 427/54; 427/150; 427/151; 521/54; 521/134; 521/136; 521/137; 521/138; 521/140
[58] Field of Search ................ 260/2.5 B; 204/159.15; 106/14.5, 21; 521/54, 53

[56] References Cited

U.S. PATENT DOCUMENTS

| | | | |
|---|---|---|---|
| 3,585,149 | 6/1971 | Vassiliades et al. | 260/2.5 F |
| 3,669,899 | 6/1972 | Vassiliades et al. | 260/2.5 F |
| 3,672,935 | 6/1972 | Miller et al. | 106/14.5 |
| 3,752,698 | 8/1973 | Vassiliades et al. | 428/342 |
| 3,779,957 | 12/1973 | Vassiliades et al. | 260/2.5 F |
| 3,781,230 | 12/1973 | Vassiliades et al. | 260/2.5 B |
| 3,801,329 | 4/1974 | Sandner et al. | 204/159.15 |
| 3,847,768 | 11/1974 | Muruyama | 204/159.15 |

Primary Examiner—Morton Foelak
Attorney, Agent, or Firm—Charles N. Shane, Jr.; Stephen H. Cagle; Wilson G. Palmer

[57] ABSTRACT

A process is provided for producing a radiation curable coating composition containing microcapsules comprising the steps of preparing a dispersion of substantially discrete microcapsules in a continuous phase, the continuous phase comprising a liquid volatile solvent, preparing a liquid radiation curable suspending medium, the liquid radiation curable suspending medium comprising one or more ethylenically unsaturated organic compounds having at least one terminal ethylenic group per molecule, mixing the dispersion of substantially discrete microcapsules in the continuous phase and the liquid radiation curable suspending medium with turbulent agitation to form an intimate mixture of the dispersion of microcapsules and the liquid radiation curable suspending medium, and applying heat and vacuum to the mixture, while maintaining the agitation, until the liquid volatile solvent is substantially removed from the mixture to form a dispersion of substantially discrete microcapsules in the liquid radiation curable suspending medium, the heat being applied to maintain the mixture at a temperature above the boiling point of the volatile solvent at the vacuum level.

14 Claims, No Drawings

PROCESS FOR THE PRODUCTION OF RADIATION CURABLE COATING COMPOSITIONS CONTAINING MICROCAPSULES

BACKGROUND OF THE INVENTION

1. Field of the Invention

This invention relates to the production of coating compositions comprising a liquid radiation curable suspending medium and having capsular material dispersed therein. In particular, it is concerned with a process of making liquid radiation curable coating compositions containing microcapsules starting with volatile solvent microcapsular dispersions. The liquid radiation curable coating compositions so produced are particularly useful, for example, for the production of pressure-sensitive carbonless copy papers.

2. Prior Art

Carbonless copy paper, briefly stated, is a standard type of paper wherein during manufacture the backside of a paper substrate is coated with what is referred to as CB coating, the CB coating containing one or more color precursors generally in capsular, and more preferably microcapsular, form. At the same time, the front side of the paper substrate is coated during manufacture with what is referred to as a CF coating which contains one or more color developers. Both the color precursor and the color developer remain in the coating compositions on the respective back and front surfaces of the paper in colorless form. This is true until the CB and CF coatings are brought into abutting relationship and sufficient pressure, as by a typewriter, is applied to rupture the CB coating to release the color precursor. At this time the color precursor transfers to the CF coating and reacts with the color developer therein to form an image. Carbonless paper has proved to be an exceptionally valuable image transfer medium for a variety of reasons only one of which is the fact that until a CB coating is placed next to a CF coating both the CB and the CF are in an inactive state as the co-reactive elements are not in contact with one another. Patents relating to carbonless paper products are:

U.S. Pat. No. 2,712,507 (1955) to Green
U.S. Pat. No. 2,730,456 (1956) to Green et al
U.S. Pat. No. 3,455,721 (1969) to Phillips et al
U.S. Pat. No. 3,466,184 (1969) to Bowler et al
U.S. Pat. No. 3,672,935 (1972) to Miller et al A third generation product which is in an advanced stage of development and commercialization at this time and which is available in some business sectors is referred to as self-contained paper. Very generally stated self-contained paper refers to an imaging system wherein only one side of the paper needs to be coated and the one coating contains both the color precursor, generally in encapsulated form, and the color developer. Thus when pressure is applied, again as by a typewriter or other writing instrument, the color precursor capsule is ruptured and reacts with the surrounding color developer to form an image. Both the carbonless paper image transfer system and the self-contained system have been the subject of a great deal of patent activity. A typical autogeneous record material system, earlier sometimes referred to as "self-contained" because all elements for making a mark are in a single sheet, is disclosed in U.S. Pat. No. 2,730,457 (1956) to Green.

A disadvantage of coated paper products such as carbonless and self-contained stems from the necessity of applying a liquid coating composition containing the color forming ingredients during the manufacturing process. In the application of CB coatings, the coating composition generally comprises a dispersion of microcapsules in an aqueous medium containing also a binder for the microcapsules. This aqueous coating composition requires removal of the excess water by drying, which drying entails the use of complex and expensive equipment and a high input of heat energy to continuously dry a substrate coated with an aqueous coating composition.

The application of heat not only is expensive, making the total product manufacturing operation less cost effective, but also is potentially damaging to the color forming ingredients which are generally coated onto the paper substrate during manufacture. High degrees of temperature in the drying step require specific formulation of wall-forming compounds which permit the use of excess heat. The problems encountered in the actual coating step are generally attributable to the necessity for a heated drying step following the coating operation.

Many of the particular advantages of the process of this invention are derived from the fact that a radiation curable coating composition is produced which may be used to coat the paper substrate. This is in contrast to the coating used by the prior art which have generally required an aqueous or organic solvent coating. For purposes of this application the term "100% solids coating" will sometimes be used to describe the coating operation and should be understood to refer to the fact that a radiation curable coating composition is used and therefore the drying step usually present in the manufacture of paper and in coating has been eliminated.

In general, patents concerned with the production and application of liquid resin compositions containing no volatile solvent, which resin compositions are subsequently cured by radiation to a solid film are:

U.S. Pat. No. 3,551,235 (1970) to Bassemir et al
U.S. Pat. No. 3,551,246 (1970) to Bassemir et al
U.S. Pat. No. 3,551,311 (1970) to Nass et al
U.S. Pat. No. 3,558,387 (1971) to Bassemir et al
U.S. Pat. No. 3,661,614 (1972) to Bassemir et al
U.S. Pat. No. 3,720,534 (1973) to Macanlay et al
U.S. Pat. No. 3,754,966 (1973) to Newman et al
U.S. Pat. No. 3,772,062 (1973) to Shur et al
U.S. Pat. No. 3,772,171 (1973) to Savageau et al
U.S. Pat. No. 3,801,329 (1974) to Sandner et al
U.S. Pat. No. 3,819,496 (1974) to Roskott et al
U.S. Pat. No. 3,847,769 (1974) to Garratt et al
U.S. Pat. No. 3,847,768 (1974) to Kagiya et al These compositions generally also contain a pigment or a dye. Such resin compositions are useful for protective coatings and fast drying inks. U.S. Pat. Nos. 3,754,966 and 3,720,534 describe the production of an ink releasing dry transfer element which can be used as a carbon paper or typewriter ribbon. The above mentioned patents do not disclose the use of microcapsules in their liquid radiation curable compositions and therefore are not faced with the problem solved by the instant invention, that of converting a dispersion of microcapsules in volatile solvent to a dispersion of microcapsules in a radiation curable coating composition.

The use of microcapsules in coating compositions which are cured by radiation to produce transfer (CB) sheets is disclosed in commonly-assigned co-pending application U.S. Application Ser. No. 684,462 filed May 7, 1976, now U.S. Pat. No. 4,091,122. In this co-pending application, the microcapsules contained a chromogenic material (color precursor) in solution in an oil. The CB coating compositions used therein were prepared by dispersing a dry powder of the microcapsules in a radiation curable substance. The cured radiation curable substance acted as binder for the microcapsules in the finished transfer sheet. Preparation of the dry powder of microcapsules was by spray drying an aqueous dispersion of microcapsules.

In the present invention, the separate steps of drying and redispersing the microcapsules in a radiation curable binder can be eliminated. Dispersions of microcapsules in any volatile solvent can be converted to dispersions of microcapsules in a radiation curable coating composition by applying heat and vacuum to a mixture of the microcapsule dispersion in the volatile solvent and a radiation curable suspending medium. Sufficient heat is needed only to vaporize the solvent. Temperatures may be maintained at room temperature or slightly higher. Damage due to storage and handling of a microcapsular powder are substantially eliminated. The use of heat in combination with a vacuum permits the effective removal of the volatile solvent without requiring an excess of either heat or vacuum. The process can be operated continuously. For purposes of this application the term volatile solvent shall be used to refer to aqueous and non-aqueous low boiling solvents and would include among others water and organic solvents.

STATEMENT OF THE INVENTION

A process is provided for producing a radiation curable coating composition containing microcapsules comprising the steps of preparing a dispersion of substantially discrete microcapsules in a continuous phase, the continuous phase comprising a liquid volatile solvent, preparing a liquid radiation curable suspending medium, the liquid radiation curable suspending medium comprising one or more ethylenically unsaturated organic compounds having at least one terminal ethylenic group per molecule, mixing the dispersion of substantially discrete microcapsules in the continuous phase and the liquid radiation curable suspending medium with turbulent agitation to form an intimate mixture of the dispersion of microcapsules and the liquid radiation curable suspending medium, and applying heat and vacuum to the mixture, while maintaining the agitation, until the liquid volatile solvent is substantially removed from the mixture to form a dispersion of substantially discrete microcapsules in the liquid radiation curable suspending medium, the heat being applied to maintain the mixture at a temperature above the boiling point of the volatile solvent at the vacuum level.

DETAILED DESCRIPTION OF THE INVENTION

The process of this invention involves the production of a radiation curable coating composition containing microcapsules. In its broadest form, the process is accomplished by mixing a microcapsular dispersion in a volatile solvent continuous phase with a liquid radiation curable suspending medium and applying a vacuum while maintaining mixing and a temperature high enough to evaporate the volatile solvent by boiling until substantially all of the solvent is removed from the mixture. In the most preferred process of this invention, the volatile solvent is water.

An essential feature of the process of this invention is the condition under which the volatile solvent continuous phase of the solvent dispersion of microcapsules is exchanged for the liquid radiation curable suspending medium as the continuous phase. This is accomplished by the application of a vacuum and sufficient heat to evaporate the solvent. The particular difficulty lies in the sensitivity of microcapsules to heat, in particular, moist heat, and high shear conditions. In order for this exchange to be successful, it must take place without rupture or substantial deterioration of the microcapsules to the point where the microcapsules are functionally ineffective. We have found that by controlling the conditions of the exchange as follows, a dispersion of microcapsules in a liquid radiation curable suspending medium can be successfully produced.

1. The microcapsular dispersion in a volatile solvent is a dispersion of substantially discrete microcapsules.
2. The temperature throughout the mixing step is low enough to prevent substantial heat deterioration of the microcapsules.
3. The vacuum is high enough to substantially lower the boiling temperature yet not high enough to rupture the microcapsules.
4. The combined effect of the temperature and vacuum is evaporation of the volatile solvent and the temperature is maintained above that of the boiling point of the volatile solvent.
5. Mixing of the aqueous microcapsular dispersion and the liquid radiation curable suspending medium is by low shear turbulent agitation.

These conditions and their effect on the resultant microcapsular dispersions are explained in detail later in this description.

The coating compositions produced by the process of this invention are dispersions of substantially discrete microcapsules in a liquid radiation curable suspending medium. On applying the coating compositions of this invention to a substrate and allowing the composition to set by radiation curing, the radiation curable suspending medium acts as a binder for the microcapsules to facilitate adherence of the microcapsules to the substrate. Microcapsules containing pharmaceutical agents, aromas, perfumes, flavoring agents, insecticides, dyes, pigments and color precurors may be dispersed in liquid radiation curable suspending medium by the process of this invention and coated on a variety of substrates including papers, fabrics and plastic films.

A preferred embodiment of this invention is the production of radiation curable microcapsular coating compositions which may be used in the preparation of pressure-sensitive carbonless copy papers, in particular, carbonless transfer papers. The preparation of these carbonless transfer papers is described in detail in a commonly-assigned co-pending application entitled, "Process for Producing Pressure-Sensitive Copy Sheets Using Novel Radiation Curable Coatings", U.S. Application Ser. No. 684,462 filed May 7, 1976, now U.S. Pat. No. 4,091,122 which is incorporated herein by reference. The process of this invention will hereinafter be described in detail with respect to this preferred embodiment.

In the preferred embodiment, the radiation curable coating composition is essentially a dispersion of an encapsulated chromogenic material in a radiation curable suspending medium. For purposes of this application, "chromogenic material" will refer to color precursors, color formers, color developers and the like. The encapsulated chromogenic material is usually an oil solution of one or more color precursors. The coating composition can contain, in addition to the encapsulated chromogenic material, fillers, stilt material, such as Arrowroot starch granules and dispersing agents. The type and amount of such additional ingredients in the coating composition are strictly a matter of choice and are generally dependent on the desired final product. Also, the coating composition can contain additional materials which function as photoinitiators. Addition of these materials depends upon the particular method of curing the coating.

Although any of the color precursors or color formers known in the prior art can be used, the color precursors most useful in the practice of the preferred embodiment of this invention are the color precursors of the electron-donating type. The preferred group of electron donating color precursors include the lactone phthalides, such as Crystal Violet Lactone, and 3,3-bis-(1'-ethyl-2-methylindol-3'-yl) phthalide, the lactone fluorans, such as 2-dibenzylamino-6-diethylaminofluoran and 6-diethylamino-1, 3-dimethylfluorans, the lactone xanthenes, the leucoauramines, the 2-(omega substituted vinylene)-3,3-disubstituted-3-H-indoles and 1,3,3-trialkylindolinospirans. Mixtures of these color precursors can be used if desired. In the preferred process of this invention, microencapsulated oil solutions of color precursors are used. The color precursors are preferably present in such oil solutions in an amount of from about 0.5% to about 20.0% based on the weight of the oil solution, and the most preferred range being from about 2% to about 7%.

In the practice of this invention the microcapsules are prepared in the form of a dispersion in a volatile solvent. In general, the more uniform the microcapsular dispersion, the better the final product. As has been defined hereinabove, the volatile solvents useful in the practice of this invention include both aqueous and non-aqueous solvents. Of the non-aqueous solvents the most preferred are the organic solvents such as: benzene, xylene, toluene, carbon tetrachloride, chloroform, methylene dichloride, cyclohexane, n-hexane, n-butylacetate and diethylether.

The radiation curable suspending media useful in the practice of this invention comprise the free radical polymerizable ethylenically unsaturated organic compounds. These compounds must contain at least one terminal ethylenic group per molecule. They are liquid and act as dispering media for the chromogenic material and other ingredients of the coating composition. They are curable to a solid resin when exposed to ionizing or ultraviolet radiation. Curing is by polymerization.

A preferred group of radiation curable compounds are the polyfunctional ethylenically unsaturated organic compounds which have more than one (two or more) terminal ethylenic groups per molecule. Due to the polyfunctional nature of these compounds, they cure under the influence of radiation by polymerization, including crosslinking, to form a hard, dry, tack-free film.

Included in this preferred group of radiation curable compounds are the polyesters of ethylenically unsaturated acids such as acrylic acid and methacrylic acids, and a polyhydric alcohol. Examples of some of these polyfunctional compounds are the polyacrylates or methacrylates of trimethylolpropane, pentaerythritol, dipentaerythritol, ethylene glycol, triethylene glycol, propylene glycol, glycerin, sorbitol, neopentylglycol and 1,6-hexanediol, hydroxy-terminated polyesters, hydroxy-terminated epoxy resins, and hydroxy-terminated polyurethanes polyphenols such as bisphenol A. An example of a polyacrylate of a hydroxy-terminated polyurethane found to be useful in this invention is di(2'-acryloxyethyl)-4-methylphenylenediurethane.

Also included in this group are polyallyl and polyvinyl compounds such as diallyl phthalate, tetrallyloxyethane, divinyl adipate, butane divinyl ether and divinylbenzene. Mixtures of these polyfunctional compounds and their oligomers and prepolymers may be used if desired.

A second group of radiation curable compounds are ones which have one terminal ethylenic group per molecule. Examples of such monofunctional compounds are the $C_8$ to $C_{16}$ alcohol esters of acrylic and methacrylic acid, styrene, substituted styrenes, vinyl acetate, vinyl ethers and allyl ethers and esters. In general, these compounds are liquid and have a lower viscosity than the polyfunctional compounds and thus may be used to reduce the viscosity of the coating composition to facilitate coating by any desired method. These compounds are radiation curable and react with the ethylenically unsaturated polyfunctional organic compounds during radiation curing to give a hard, dry, flexible film. Compounds having only one terminal ethylenic group may be used alone as the radiation curable substance. However, the resultant radiation cured film may be rather soft and pliable and may be somewhat too tacky for commercial use. The preferred radiation curable substance is a mixture containing one or more polyfunctional compounds and one or more monofunctional compounds. By proper selection of these compounds a chromogenic coating composition having the desired coating characteristics for any type of coating application can be made, and a hard, flexible, tack-free radiation cured film can be obtained. In general, the most desired films are obtained by using a radiation curable substance comprising from about 33% to about 67% of the polyfunctional compounds to about 33% to about 67% of the monofunctional compounds.

The radiation curable substance can be present in the microcapsular coating composition in an amount of from about 25% to about 80% by weight of the composition. The preferred range is from about 35% to about 75% and the most preferred range is about 40% to about 70%.

A photoinitiator is preferably added to the coating compositions if the composition is to be cured by ultraviolet radiation. A wide variety of photoinitiators are available which serve well in the system described in this invention. The preferred photoinitiators are the benzoin alkyl ethers, such as, Vicure 30 (a mixture of alkylbenzoin ethers manufactured and sold by Stauffer Chemical Co., Westport, Conn.), benzoin butyl ether (Vicure 10, Stauffer), benzoin methyl ether, and a,a-diethoxyacetophenone. Other photoinitiators which have been used are benzophenone, 4,4'-bis-(dimethylamino)-benzophenone, ferrocene, xanthone, thioxanthane, a,a-azobisisobutylnitrile, decabromodiphenyloxide, pentabromomonochlorocyclohexane, pentachlorobenzene, polychlorinated biphenyls such as the Arochlor 1200 series (manufactured and sold by Monsanto Chemical Co., St. Louis, Mo.), benzoin ethyl ether, 2-ethylanthroquinone, 1-(chloroethyl) naphthalene, desyl chloride, chlorendic anhydride, and naphthalene sulfonyl chloride, 2-bromoethyl ethyl ether-zinc oxide combined with a small quantity of water also serves as a good substitute photoinitiation system. The amount of photoinitiator added can be from about 0.2% to about 10% by weight of the coating composition, with a preferred range being from about 3% to about 8% by weight.

Photoinitiation synergists can also be added to the ultraviolet curing coating compositions. Photoinitiation synergists serve to enhance the initiation efficiency of the photoinitiators. The preferred synergists are chain transfer agents, such as the tertiary alcoholamines and substituted morpholines, such as triethanolamine, N-methyldiethanolamine, N,N-dimethylethanolamine and N-methylmorpholine. The amount of photoinitiation synergist added can be from about 0.2% to about 10% by weight of the coating composition, with a preferred range being from about 3% to about 8% by weight.

The dispersibility of any particular microcapsular system in any particular radiation curable system is a function of the chemical compatibility of the two systems. The degree of dispersibility of the microcapsules desired depends on the use of the microcapsular coated product. For some uses, such as for perfumed paper, the presence of large numbers of agglomerated clusters is not objectionable. However, poor dispersions containing predominately clusters of microcapsules result in unsatisfactory carbonless paper products which do not image properly and which suffer from feathering and incomplete and irregular line and image formation. It has been determined experimentally that dispersions which contain about an equal number of microcapsular clusters and single microcapsules produce carbonless papers which are commercially acceptable. A more preferred dispersion would be a dispersion in which relatively few clusters appear. For purposes of this invention, such a dispersion is described herein as "a dispersion of substantially discreet microcapsules". Dispersibility is considered a key characteristic of any radiation curable system including microcapsules. Dispersibility can be attained by several methods although the use of extreme process conditions such as high shear agitation or heat are generally not considered feasible in carbonless paper manufacture.

The particular wall-forming materials or the particular encapsulated chromogenic material are not asserted to be an inventive feature herein. Rather, there are described in the patent literature various capsular chromogenic materials which may be used. Such chromogenic materials have been encapsulated in gelatin wall-forming materials (see U.S. Pat. Nos. 2,730,456 and 2,800,456) including gum arabic, polyvinyl alcohol, carboxymethylcellulose, resorcinol-formaldehyde wall-formers (see U.S. Pat. No. 3,755,190), isocyanate wall-formers (see U.S. Pat. No. 3,914,511) isocyanate-polyol wall-formers (see U.S. Pat. No. 3,796,669) and hydroxypropylcellulose (see commonly assigned, co-pending application Ser. No. 480,956, filed June 19, 1975, now U.S. Pat. No. 4,025,455) in addition to mixtures of the above. Microencapsulation has been accomplished by a variety of known techniques including coacervation, interfacial polymerization, polymerization of one or more monomers in an oil and various melting, dispersing and cooling methods. Compounds which have been found preferable for use as wall-forming materials in the various microencapsulation techniques include: hydroxypropylcellulose, methycellose, carboxymethylcellulose, gelatin, melamine-formaldehyde, polyfunctional isocyanates and prepolymers thereof, polyfunctional acid chlorides, polyamines, polyols, epoxides and mixtures thereof.

Particularly well-suited to use in the present invention are microcapsules of a hydroxypropylcellulose (HPC) material and isocyanate-polyol materials. This is because such microcapsules can be dispersed in most radiation curable media. In addition, the HPC and isocyanate-polyol capsules have good permeability, strength, and temperature characteristics.

In general, the microcapsules prepared as indicated above are in the form of an aqueous dispersion of the microcapsules although most can also be used in the form of a dispersion of microcapsules in a volatile organic solvent. The dried miocrocapsules can then be redispersed by mechanical means in a radiation curable suspending medium.

Using the process of the instant invention, the conversion of the microcapsular dispersion in a volatile solvent to a dispersion of microcapsules in a radiation curable suspending medium is accomplished in one exchange process step. The process may be either batch or continuous. In the batch process, the volatile solvent dispersion of microcapsules and the radiation curable suspending medium are mechanically mixed together in a closed environment and a vacuum is applied to the closed environment. The temperature must be maintained above the boiling point of the volatile solvent at the particular vacuum level use.

In practice, the microcapsular dispersion and radiation curable suspending medium can be completely mixed together before introducing the mixture into the kettle, the rate of evaporation being controlled by controlling the application of heat and vacuum. Alternatively the microcapsular dispersion can be introduced slowly, such as by dropwise introduction into the vessel. Such an environment can be conveniently produced in a closed vessel, such as a resin kettle, and in a variety of additional commercially available closed containers where the application of heat and vacuum can be controlled. In this apparatus, a mixture of the dispersion of microcapsules in a volatile solvent liquid radiation curable suspending medium can be introduced into the kettle batchwise and the heat and vacuum can be applied and maintained until substantially all of the volatile solvent is removed from the system. Depending on the size of the batch, this may take a matter of minutes to several hours. Turbulent mixing of the low shear type, such as by a rotating paddle, of the contents of the kettle materially reduces the time of batch treatment and improves the dispersion of the microcapsules. For purposes of this application the term "low-shear" shall be understood to refer to the shear force sufficient to perform satisfactory turbulent mixing without at the same time rupturing or otherwise causing substantial deterioration of the microcapsule. It should further be understood that the shear force which can be used satisfactorily will vary depending among other things on the type of microcapsule used.

A preferred form of the process can be obtained using a thin film evaporator. Such evaporators are generally tubular in construction with the evaporating section of the tube being equipped with rotating wiper blades. The wiper blades may contact the cylindrical walls of the evaporator or there may be a slight gap in the order of several thousandths of an inch between the wiper blades and the wall. In either case, a thin film of the liquid to be treated is formed on the cylinder wall by the centrifugal action of the rotating blades. The rotating blades continuously agitate the thin film material being treated and keep it in a turbulent condition as it passes through the evaporating section. Treatment times are in the order of a few seconds. Heat necessary for the evaporation of the volatile solvent is applied through the walls of the evaporator. Thus, the temperature of the material being treated can be maintained at the desired temperature by controlling the temperature of the applied heat.

Both horizontally and vertically mounted thin film evaporators can be used in the process of this invention. By horizontally mounted is meant that the axis of the tube and rotating wiper blades is horizontal. Likewise, in vertically mounted thin film evaporators the axis of the tubes and rotating wiper blades is vertical. This thin film evaporator apparatus has the advantage of being capable of operating in a manner in which the solvent dispersion of microcapsules and liquid radiation curable suspending medium can be continuously introduced either separately or as a premix ahead of the rotating wiper blades and withdrawing the dispersion of microcapsules in the radiation curable suspending medium at a point after passing through the rotating wiper blades of the evaporator.

A significant advantage is that the dwell time of the mixture in the evaporator can be a matter of seconds which materially reduces the possibility of degradation and/or deterioration of the microcapsules. In practice the inlet ports may be located just within the rotating blade section at either end of the tube. The particular construction of the evaporator is not asserted to be an inventive feature of this invention.

The dispersion of microcapsules in the radiation curable suspending medium can be withdrawn from the evaporator either continuously or intermittently, as desired, using any convenient means of removal such as by pumping.

In the preferred form of this process, streams of the aqueous dispersion of microcapsules and the liquid radiation curable suspending medium are continuously introduced into a thin film evaporator ahead of the rotating wiper blades. The two streams are preferably introduced separately whereby the mixing is done by the rotating wiper blades. These blades may rotate at speeds of, for example, 600 to 1000 rpm. Turbulent, low shear agitation is maintained during the evaporation by the rotating wiper blades.

Throughout the preferred process of this invention the temperature is maintained at a temperature above the boiling point of the volatile solvent at the vacuum level in the evaporator to provide quick evaporation of the volatile solvent. In general, the vacuum level can be from an absolute pressure of about 25 mm. to 760 mm. Hg. The temperature can be maintained at room temperature or slightly above. A preferred temperature range is from about 20° C. to about 40° C. Heat is applied at a rate necessary to replace heat lost in evaporating the volatile solvent. The aqueous dispersion of microcapsules is preferably added at room temperature or only slightly above. Maintaining too high a temperature can deteriorate and effectively prohibit the ability of the microcapsules to function properly. High temperatures cause the microcapsules to agglomerate and in some cases cause the microcapsule walls to swell to the point where they lose their contents by permeation or rupture. The temperature at which this deterioration occurs varies widely depending on the interaction of the particular wall-forming material used in making the microcapsules and the particular radiation curable suspending medium.

In practice, the preferred wall temperature of the evaporator is as high as possible without degrading the microcapsules. Under this temperature condition deterioration of the microcapsules is minimized.

The vacuum used in this operation is to reduce the boiling point thus permitting rapid removal of the volatile solvent by evaporation without prolonged exposure of the capsules to high temperature particularly when in contact with water. Microcapsules tend to deteriorate rapidly with prolonged exposure to water at, say, 100° C.

Using the wiped film evaporator, the dwell time of the microcapsules in contact with the hot water can be materially reduced being on the average only a few seconds before the water is evaporated. By metering the flow of the liquid radiation curable suspending medium and the aqueous dispersion to the evaporator, the relative ratio of microcapsules to radiation curable suspending medium in the resulting radiation curable coating composition can be controlled as desired.

Mixing as applied to the process of this invention is of the low shear, turbulent type. The purpose of this turbulent mixing is to bring together in intimate contact the dispersion of the microcapsules in a volatile solvent and the radiation curable suspending medium. Further, it prevents agglomeration of the microcapsules during the critical exchange of the continuous phase of the microcapsule dispersion for the continuous liquid radiation curable phase.

The following examples further illustrate but do not limit the invention. The amounts given on the examples are in parts by weight.

EXAMPLE 1

The capsule mixture used in this experiment was prepared by using an internal phase, which contained 240 parts of glycerin, 120 parts of distilled water, 15.6 parts of sodium hydroxide, 8.4 parts of vanadium pentoxide, and 16 parts of sodium bromide encapsulated as follows: The internal phase was emulsified into a liquid containing 600 parts of toluene, 96 parts n-butyl acetate and 48 parts of polyvinyl acetate. To this emulsion was then added slowly with stirring 300 parts toluene, 72 parts n-butyl acetate, 9.24 parts Desmodur E-21 and 34.44 parts of Desmodur N-100. (Desmodur N-100 is a liquid biuret made by reacting hexamethylene diisocyanate with water in a 3 to 1 molar ratio and Desmodur E-21 is an aromatic polyisocyanate prepolymer. Both Desmodur N-100 and E-21 are made and sold by Mobay Chemical Co., Pittsburgh, Pa.) The microcapsules were cured overnight at 40° C. while stirring. The continuous phase was about 85% toluene - 15% n-butyl acetate. The percent of microcapsules in this mixture was about 32%.

To a 500 ml. round bottom flask was added 100 parts of the above mixture, 20 parts of Ucar Actomer X-80 (an acrylic oligomer made and sold by Union Carbide), 15 parts of neopentyl glycol diacrylate, and 15 parts of 2-ethylhexyl acrylate. This flask was then attached to a rotary evaporator and n-butyl acetate and toluene were removed by vacuum evaporation. The vacuum was obtained by a water aspirator. Mixing was provided by rotating the round bottom flask. This resulting radiation curable coating composition was used in the following 3 coating procedures:

(A) To a 100 ml. beaker, was added 20 parts of the radiation curable coating composition prepared as above. Then, 0.5 parts of benzoin methyl ether was added and mixed into the coating composition. The resulting mixed radiation curable coating composition was then applied to a paper substrate which had been coated with a thin coating of polyvinyl alcohol to prevent penetration of the radiation curable coating composition into the paper. The coating composition was applied using a No. 10 Mayer bar. The coated paper was then exposed to ultraviolet light by passing the coated paper through a QC 1202 AN Processor (manufactured and sold by Radiation Polymer Co., a division of PPG Industries.) The processor was equipped with 2 twelve inch 200 watts per lineal inch medium pressure mercury lamps and the lamps were about 3 inches from the coated paper. The coated paper was repeatedly passed through the Processor until the coated surface was tack-free. The resulting coated cured paper performed well as the CB part of a carbonless copy system using a CF developer sheet coated with 2-ethylhexyl gallate.

(B) The same coating procedure as (A) was performed except 0.5 parts of triethanolamine was also dissolved into the coating composition, and the coating was cured under the air blanket only. The addition of triethanolamine shortened the curing time of the coating.

(C) The radiation curable coating composition was coated onto the PVA basecoated sheet by a No. 10 Mayer bar and cured by an electron beam which was run with 5 megarads, at 300 KV, and passing through at a speed of 30 ft./min. The resulting sheet performed well at the CB part of a carbonless copy paper system using a 2-ethylhexyl gallate coated CF paper.

EXAMPLE 2

The capsule mixture used in this experiment was prepared by an in situ encapsulation of an internal phase, which contained colorless lactone color precursors in monoisopropylbiphenyl and isocyanate-polyol walls with water as continuous phase. The percent solids of this aqueous capsule mixture was 36%.

A 3-neck 500 ml resin flask was equipped with a mechanical stirrer, an addition funnel, and a vacuum line to a water aspirator. A solution, which was made by dissolving 20 parts of Ucar Actomer X-80, 10 parts of neopentyl glycol diacrylate, and 10 parts of pentaerythritol tetraacrylate in 20 parts of 2-ethylhexyl acrylate, was charged into the flask. This flask was submerged in a 60°-63° C. paraffin oil bath. To the addition funnel was added 100 parts of the aqueous capsule mixture. This capsule mixture was dripped into the flask during a period of 105 minutes while stirring and under reduced pressure to remove water. After finishing the addition, the mixture was stirred under vacuum for another 90 minutes to further remove the water. To 20 parts of this resulting mixture was then added 0.5 parts of benzoin methyl ether. After the benzoin methyl ether was dissolved into the continuous phase, a drawdown of this mixture was made by a No. 10 Mayer bar onto PVA basecoated paper. The coating was then cured by the PPG Processor until it was tack-free. This resulting sheet performed very well against a novolak coated CF sheet to give clear, blue images.

EXAMPLE 3

Example 2 was repeated except that the microcapsules were HPC microcapsules and the radiation curable solution contained 100 parts of 2-ethylhexyl acrylate, 5.4 parts of 2-(N,N-diethylamino)ethyl acrylate, 50 parts of Ucar Actomer X-70, and 50 parts of pentaerythritol triacrylate instead of the radiation curable medium used in Example 2; and that the oil bath temperature was at 60° C. instead of at 60°-63° C.

To 10 parts of this exchanged mixture was dissolved 0.4 parts of Vicure 30 photoinitiator (a mixture of alkylbenzoin ethers manufactured and sold by Stauffer Chemical Co., Westport, Conn.) and the resultant coating composition was coated onto a PVA basecoated sheet by a No. 20 Mayer bar and the coating was then exposed to ultraviolet light on the PPG Processor. The transfer sheet of the carbonless copy paper system so prepared performed well against a novolak coated sheet to give clear, blue images.

EXAMPLE 4

A solution of 250 grams of pentaerythritol triacrylate, 500 grams of 2-ethylhexyl acrylate, 27 grams of 2-(N,N-diethylamino)ethyl acrylate, and 250 grams of UCAR Actomer X70, (a multifunctional acrylate with molecular weight of about 1250 from Union Carbide Corporation, New York, N.Y.) was prepared. To 600 grams of the solution, 390 grams of an aqueous capsule dispersion containing 40%, by weight, HPC microcapsules were added with laboratory propeller mixing to form a uniform mixture of the two liquids. The mixture was placed in a reservoir and fed to a thin film evaporator using a Zenith metering pump. The pump delivered the mixture at 7.5 grams per minute. The liquid stream was introduced into a jacketed, glass, wiped film evaporator (Scientific Glass and Instruments, Inc., Houston, Tex., Catalog No. 12000) just above the vertical wiper blades which rotated at 600 rpm. A temperature of about 42° C. was maintained on the evaporator walls by continuously circulating 42° C. water through the jacket. The pressure within the evaporator was maintained at an absolute pressure of 40 mm. Hg. Vigorous boiling was observed at the point where the stream entered the evaporator and the boiling became less vigorous as the mixture progressed down the evaporator walls. Boiling was almost completely absent where the white, fluid, dry liquid left the evaporator. The microcapsules appeared to be well dispersed and the dispersion was smooth and free of lumps.

A mixture of 20 grams of the product and 0.5 grams of Vicure 30 photoinitiator was applied to a 13.5 lb. per 1330 square foot bond paper with PVA barrier coat using a No. 10 Mayer rod. The coating was cured by 4 passes through at 40 ft/min., with 2-200 w. lamps. The lamps were 3 inches from the coating. When pressure imaged against a novolak resin coated record sheet, a clear, blue, well defined image resulted.

What is claimed is:

1. A process for the preparation of a radiation curable coating composition for use in the manufacture of carbonless copy paper, said coating composition being capable of being set to a solid without the application of heat, said radiation curable coating composition containing microcapsules comprising the steps of:
    (a) providing a dispersion of substantially discrete microcapsules in a continuous phase, said continuous phase comprising a liquid volatile solvent, said microcapsules containing a solution of chromogenic material, said microcapsules being impermeable to said solution of chromogenic material;

(b) providing a liquid radiation curable suspending medium, said liquid radiation curable suspending medium comprising one or more ethylenically unsaturated organic compounds having at least one terminal ethylenic group per molecule, said radiation curable suspending medium being polymerizable by ultraviolet or ionizing radiation to a solid resin;

(c) mixing said dispersion of substantially discrete microcapsules in said continuous phase and said liquid radiation curable suspending medium with turbulent agitation to form an intimate mixture of said dispersion of microcapsules and said liquid radiation curable suspending medium said mixing taking place without displacement of said solution of chromogenic material from said microcapsules; and (d) applying heat and vacuum to said mixture, while maintaining said agitation, until said liquid volatile solvent is substantially removed from said mixture to form a dispersion of substantially discrete microcapsules in said liquid radiation curable suspending medium, said heat and vacuum being applied without displacement of said solution of chromogenic material from said microcapsules, said heat being applied to maintain said mixture at a temperature above the boiling point of said volatile solvent at said vacuum.

2. The process of claim 1 wherein said radiation curable suspending medium is a mixture of ethylenically unsaturated organic compounds, said mixture comprising from about 33% to about 67% by weight of said compounds having one terminal ethylenic group per molecule and from about 33% to about 67% by weight of said compounds having more than one ethylenic group per molecule.

3. The process of claim 1 wherein said volatile solvent is water.

4. The process of claim 3 wherein said radiation curable suspending medium is water insoluble.

5. The process of claim 3 wherein said radiation curable suspending medium is water soluble.

6. The process of claim 1 wherein said radiation curable coating composition additionally contains a photoinitiator.

7. The process of claim 1 wherein metered quantities of said dispersion of microcapsules and said liquid radiation curable suspending medium are continuously mixed with agitation in an evaporator provided with a source of heat, vacuum and continuous turbulent agitation and said mixture with substantially all of the volatile solvent removed is continuously withdrawn from said evaporator.

8. The process of claim 7 wherein said mixing of said dispersion of microcapsules and said liquid radiation curable suspending medium occurs within said evaporator.

9. The process of claim 1 wherein said microcapsules contain an oily solution of a color precursor.

10. The process of claim 1 wherein said microcapsules are prepared by encapsulating an oil solution of a chromogenic material in a wall-forming compound selected from one or more of the group consisting of hydroxypropylcellulose, carboxymethylcellulose, gelatin, melamine-formaldehyde, polyfunctional isocyanates and prepolymers thereof, polyfunctional acid chlorides, polyamines, polyols, epoxides and mixtures thereof.

11. The process of claim 5 wherein said step of mixing together with agitation said aqueous dispersion of substantially discrete microcapsules and said liquid radiation curable suspending medium comprises dissolving said liquid water soluble radiation curable suspending medium in said aqueous continuous phase of said aqueous dispersion of microcapsules, said dissolving resulting in the formation of a homogeneous mixture.

12. A process for the continuous preparation of a radiation curable coating composition for use in the manufacture of carbonless copy paper, said coating composition being capable of being set to a solid without the application of heat, said radiation curable coating composition containing microcapsules comprising the steps of:

(a) continuously providing a dispersion of substantially discrete microcapsules in an aqueous continuous phase, said microcapsules containing a solution of chromogenic material, said microcapsules being impermeable to said solution of chromogenic material;

(b) continuously providing a water insoluble radiation curable suspending medium, said radiation curable suspending medium comprising one or more ethylenically unsaturated organic compounds having at least one terminal ethylenic group per molecule, said radiation curable suspending medium being polymerizable by ultraviolet or ionizing radiation to a solid resin;

(c) continuously mixing said aqueous dispersion of substantially discrete microcapsules and said liquid radiation curable suspending medium with turbulent agitation in an evaporator to form an intimate mixture of said aqueous dispersion and said liquid radiation curable suspending medium said mixing taking place without displacement of said solution of chromogenic material from said microcapsules;

(d) continuously applying heat and vacuum to said mixture in said evaporator, while maintaining said turbulent agitation, until water is substantially removed from said mixture to form a dispersion of said substantially discrete microcapsules in said liquid water insoluble radiation curable suspending medium said heat and vacuum being applied without displacement of said solution of chromogenic material from said microcapsules, said heat being applied to maintain said mixture at a temperature above the boiling point of water at said vacuum, whereby said agitation, said temperature and said vacuum are sufficiently low to prevent substantial deterioration of said microcapsules; and (e) continuously withdrawing said dispersion of substantially discrete microcapsules in said radiation curable suspending medium from said evaporator.

13. A process for the continuous preparation of a radiation curable coating composition for use in the manufacture of carbonless copy paper, said coating composition being capable of being set to a solid without the application of heat, said radiation curable coating composition containing microcapsules comprising the steps of:

(a) continuously providing a dispersion of substantially discrete microcapsules in an organic solvent, said microcapsules containing an aqueous solution of chromogenic material, said microcapsules being impermeable to said solution of chromogenic material;

(b) continuously providing a liquid radiation curable suspending medium, said radiation curable suspending medium comprising one or more ethylenically unsaturated organic compounds having at least one terminal ethylenic group per molecule, said radiation curable suspending medium being polymerizable by ultraviolet or ionizing radiation to a solid resin;

(c) continuously mixing said organic solvent dispersion of substantially discrete microcapsules and said liquid radiation curable suspending medium with turbulent agitation in an evaporator to form an intimate mixture of said dispersion of microcapsules and said liquid radiation curable suspending medium said mixing taking place without displacement of said solution of chromogenic material from said microcapsules;

(d) continuously applying heat and vacuum to said mixture in said evaporator, while maintaining said turbulent agitation, until said organic solvent is substantially removed from said mixture to form a dispersion of said substantially discrete microcapsules in said liquid radiation curable suspending medium, whereby said agitation, said temperature and said vacuum are sufficiently low to prevent substantial deterioration of said microcapsules, said heat and vacuum being applied without displacement of said solution of chromogenic material from said microcapsules, said heat being applied to maintain the temperature of said mixture above the boiling point of said organic solvent at said vacuum; and (e) continuously withdrawing said dispersion of substantially discrete microcapsules in said liquid radiation curable suspending medium from said evaporator.

14. The radiation curable coating composition containing microcapsules made by the process of claim 1.

* * * * *